(12) United States Patent
Huang et al.

(10) Patent No.: US 6,953,044 B2
(45) Date of Patent: Oct. 11, 2005

(54) DRAINED WATER RECOVERY SYSTEM AND METHOD FOR OPERATING THE SAME

(75) Inventors: Cheng-Chung Huang, Hsinchu (TW); Kun-Sen Sung, Miaoli (TW)

(73) Assignee: Powerchip Semiconductor Corp., Hsinchu (TW)

( * ) Notice: Subject to any disclaimer, the term of this patent is extended or adjusted under 35 U.S.C. 154(b) by 164 days.

(21) Appl. No.: 10/604,127

(22) Filed: Jun. 27, 2003

(65) Prior Publication Data

US 2004/0261844 A1 Dec. 30, 2004

(51) Int. Cl.⁷ .................. G05D 27/02; G05D 21/02; C02F 1/00
(52) U.S. Cl. .................. 137/2; 137/87.05; 137/93; 134/10; 210/746; 216/93
(58) Field of Search .................. 137/2, 93, 87.02, 137/87.05, 118.02, 571; 156/345.18; 134/10; 210/746; 216/93

(56) References Cited

U.S. PATENT DOCUMENTS

| | | | | |
|---|---|---|---|---|
| 4,042,444 | A | * | 8/1977 | Snyder .................. 156/345.15 |
| 6,177,005 | B1 | * | 1/2001 | Yamasaki et al. .......... 210/150 |
| 6,178,975 | B1 | * | 1/2001 | Aoki .................. 134/57 R |
| 6,379,538 | B1 | * | 4/2002 | Corlett et al. .............. 210/96.1 |
| 6,622,745 | B1 | * | 9/2003 | Smith et al. .................. 137/2 |

FOREIGN PATENT DOCUMENTS

| | | | |
|---|---|---|---|
| JP | 2003173961 A | * | 6/2003 |
| JP | 2004277796 A | * | 10/2004 |

OTHER PUBLICATIONS

The Industrial Technology Research Institute and Powerchip Semiconductor Corp. are cooperating to face the challenge of the standard of over 90% wastewater–recycle rate; Water Conservation Quarterly Publication vol. 27.

Application of on–line TOC on Wastewater Treatment; Industrial Polution Control and Engineering Practice Technology Seminar Paper Anthology.

Ernest E. Ludwig; Applied Process Design for Chemical and Petrochemical Plants.

* cited by examiner

*Primary Examiner*—Ramesh Krishnamurthy
(74) *Attorney, Agent, or Firm*—Jiang Chyun IP Office (57) ABSTRACT

A drained water recovery system of a process device and recovering method thereof is provided. The recovering method includes using a conductivity meter to measure the conductivity of the drained water so that the drained water with different degrees of conductivity are channeled to different pipelines. Furthermore, another conductivity meter and a total organic carbon analyzer together with an interim tank liquid level controller sorts out the recovered water. Thereafter, according to the properties of the recovered water, the drained water is re-used to improve recycling efficiency.

19 Claims, 6 Drawing Sheets

DRAINED WATER RECOVERY SYSTEM AND METHOD FOR OPERATING THE SAME

BACKGROUND OF INVENTION

1. Field of Invention

The present invention relates to a drained water recovery system and operating method thereof. More particularly, the present invention relates to a drained water recovery system of a process device and an associated recovering method.

2. Description of Related Art

In the fabrication of integrated circuit devices, one of the most frequently performed processes is wafer cleaning. In a wafer cleaning process, organic compounds, metallic impurities and micro-particles are removed from the surface of a wafer. However, most wafer cleaning processes need to consume large quantities of water. In fact, a large portion of the production cost for fabricating the integrated circuits lies in the purchase of pure water. Hence, pure water, cooling water for processing or cooling water for cooling towers is often recycled. If the process of recovering drained water for reuse is properly done, expenses on the necessary water resources and hence production cost can be reduced to boost market competition.

However, if the recovery targets at water quantity instead of water quality, the usage of the recovered water may be limited and the ultra-pure water may be contaminated leading to a drop in productivity. In many cases, the loss in yield that results from the use of contaminated water can hardly warrant the increase in the quantity of recovered water. Therefore, an efficiently managed water recovery system is very important.

The drained water recovery system of a process device operates in most semiconductor plants by collecting different types of drained water into a central location before sorting out into usage categories according to water quality. Although this method of recovering drained water is able to increase the quantity of recovered water, the quality of the recovered water cannot be improved. This type of recovery system often leads to some restrictions on the servicing capacity of the recovered water. Moreover, if a particular type of process drained water is problematic, the entire collection of drained water may have to be discarded.

SUMMARY OF INVENTION

Accordingly, an object of the present invention is to provide a drained water recovery system and method for operating the sameusing a conductivity meter installed on each processing station to sort out the type of recovered water drained from the particular station before sending to a distribution tank. Hence, contamination in the drained water of any one particular station has no effect on the drained water collection in the process drained water recovery system.

An object of this invention is to provide a drained water recovery system and method for operating the same using a conductivity meter and a total organic carbon (TOC) analyzer together with an interim tank liquid level controller to sort out the recovered water and to improve the quality of the recovered water.

To achieve these and other advantages in accordance with the purpose of the invention, as embodied and broadly described herein, the invention provides a drained water recovery system. The drained water recovery system comprises a processing station, a conductivity analyzer, a three-way valve, a controller, a recovery tank, a buffer tank, an interim tank, a first raw water tank, a second raw water tank, a first valve, a second valve, a first pump, a second pump and a total organic carbon (TOC) analyzer. The three-way valve is connected to the drain outlet of the processing station. The conductivity analyzer is installed along the pipeline between processing station and the three-way valve for analyzing the conductivity of the drained water. The controller is electrically connected to the three-way valve and the conductivity analyzer. The three-way valve is controlled by a control signal transmitted from the conductivity analyzer. According to the control signal, the three-way valve is switched so that the drained water flows in a selected direction.

The recovery tank is connected to the outlet of the three-way valve to collect initially sorted recovered water. The buffer tank is connected to the recovery tank for receiving drained water and performing a total organic carbon (TOC) analysis. The interim tank is connected to the buffer tank. The interim tank has an internal liquid level monitoring device for measuring the liquid level. The first raw water tank and the second raw water tank are connected to the interim tank for collecting recovered water of different grades. The first valve is set up between the interim tank and the first raw water tank and the second valve is set up between the interim tank and the second raw water tank. The first pump is set up between the interim tank and the first valve and the second pump is set up between the interim tank and the second valve. The total organic carbon analyzer is connected to the buffer tank for analyzing the total organic carbon value within the recovered water inside the buffer tank. The total organic carbon analyzer is also electrically connected to the first valve and the second valve for controlling the opening and closing of the first valve and the second valve. The third valve is set up along the pipeline between the buffer tank and the interim tank. In addition, another group of conductivity analyzers is connected to the buffer tank and electrically connected to the third valve for controlling the opening and closing of the third valve. The drained water recovery system may include more recovery tanks connected to the outlet of the three-way valve for carrying out subsequent recovery water sorting processes.

The drained water recovery system of this invention utilizes a conductivity meter set up besides each processing station to assess quality of the recovered water such that the drained water at different conductivity levels is sent to different pipelines. Therefore, any problem with the drained water in a particular processing station will affect the recovery of no other processing station. Furthermore, the conductivity meter and the total organic carbon analyzer together with the interim tank liquid level controller sort out and narrow down the quality of drained water in the source water tanks. Hence, overall recycling efficiency of the processed drained water is increased.

This invention also provides a method for operating the drained water recovery system. First, a conductive analyzer is used to analyze the conductivity level of the drained water flowing out form a processing station. According to the measured conductivity level, a three-way valve is turned to redirect the drained water into a first recovery tank. Thereafter, the drained water in the first recovery tank is channeled into a buffer tank and then the drained water in the buffer tank is channeled to an interim tank. The drained water inside the buffer tank is analyzed using a total organic carbon analyzer to determine whether the drained water in the interim tank is channeled to a first raw water tank or a second raw water tank.

The process of analyzing the drained water inside the buffer tank through the total organic carbon analyzer and then re-directing the drained water to the first raw water tank or the second raw water tank includes the following steps. First, a first total organic carbon value inspection of the drained water is carried out to determine whether the total organic carbon value of the drained water is below a standard level (step (a)). If the total organic carbon value of the drained water is lower than a standard value, determine whether the liquid level in the interim tank is at a first high liquid level (step (b)). If the liquid level in the interim tank is at the first high liquid level, a first pump and a first valve are turned on while a second valve is closed so that the drained water is channeled into the first raw water tank (step (c)). Thereafter, a second total organic carbon value inspection of the drained water is carried out to determine whether the total organic carbon value of the drained water is lower than a standard value (step (d)). If the total organic carbon value of the drained water is lower than the standard value, determine whether the liquid level in the interim tank is at a second high liquid level (step (e)), where the second high liquid level is higher than the first high liquid level. If the liquid level of the interim tank is at the second high liquid level, the second pump is turned on so that the channeling of drained water into the first raw water tank is accelerated (step (f)). If the total organic carbon value in the drained water is higher than the standard value (in step (a)), determine whether the liquid level in the interim tank is at a middle liquid level (step (g)). If the liquid level in the interim tank is at the middle liquid level, the first pump, the second pump and the second valve are turned on while the first valve is closed so that the drained water is channeled into a second raw water tank (step (h)). Thereafter, a second total organic carbon value inspection of the drained water is carried out to determine whether the total organic carbon value of the drained water is lower than a standard value (step (i)). If the total organic carbon value of the drained water is lower than the standard value, determine whether the liquid level in the interim tank is at a low liquid level (step 0)). If the liquid level of the interim tank is at the low liquid level, the second pump and the first pump are turned off (step (k)).

The method for operating the drained water recovery system according to this invention utilizes the conductivity meter installed on each processing station to perform a preliminary drained water sorting operation and then uses a controller to channel drained water at different conductivity levels to different pipelines. Hence, any problem the process drained water of a particular processing station will not affect the entire water recovery system. Furthermore, through the deployment of a conductivity meter and a total organic carbon analyzer together with the interim tank liquid level controller, the quality of drained water in the source water tanks is such as to maintain a high recycling efficiency.

It is to be understood that both the foregoing general description and the following detailed description are exemplary, and are intended to provide further explanation of the invention as claimed.

BRIEF DESCRIPTION OF DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION

Reference will now be made in detail to the present preferred embodiments of the invention, examples of which are illustrated in the accompanying drawings. Wherever possible, the same reference numbers are used in the drawings and the description to refer to the same or like parts.

Figure 1:
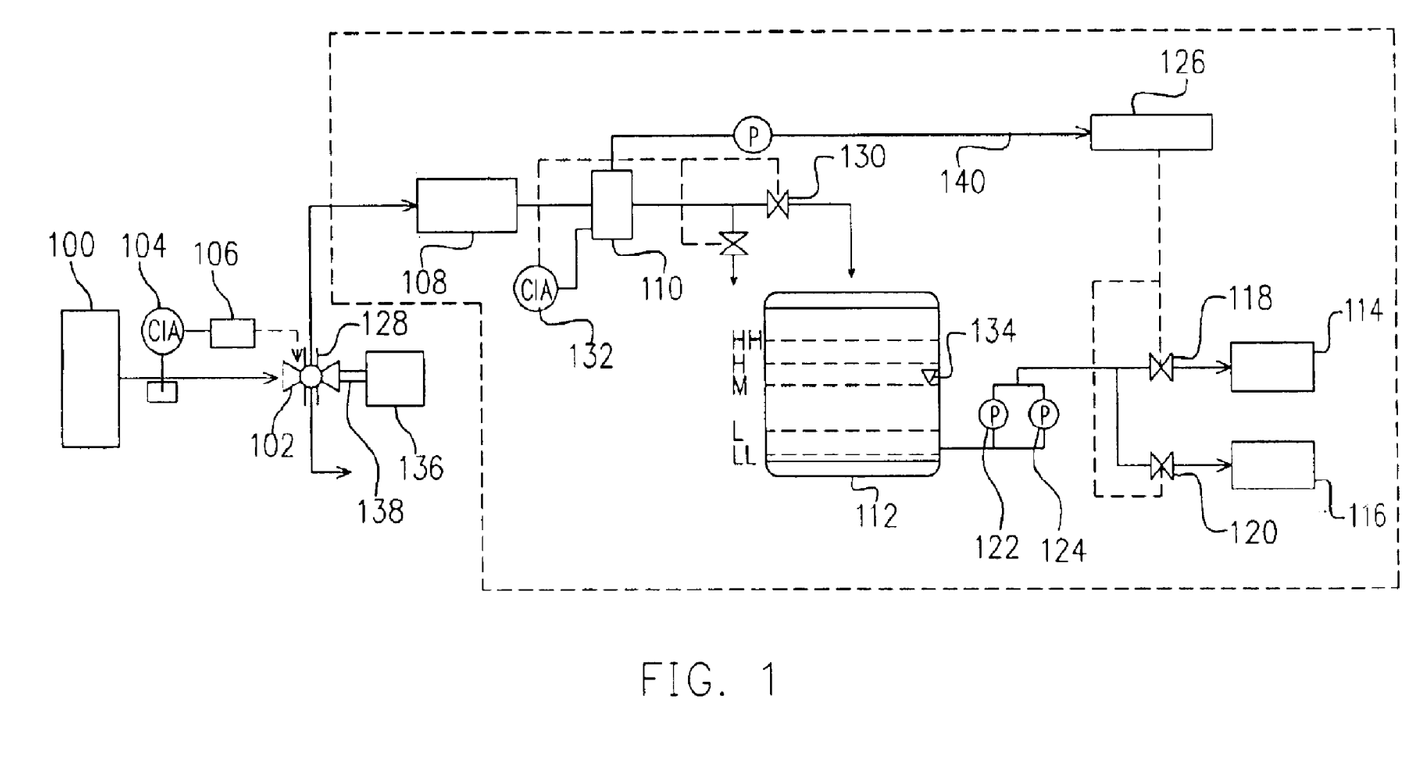
FIG. 1 is a schematic diagram showing a water recovery and sorting system according to one preferred embodiment of this invention.

FIG. 1 is a schematic diagram showing a water recovery and sorting system according to one preferred embodiment of this invention. The drained water recovery system of a process device comprises a processing station 100, a three-way valve 102, a conductivity analyzer 104, a controller 106, a recovery tank 108, a buffer tank 110, an interim tank 112, a first raw water tank 114, a second raw water tank 116, a first valve 118, a second valve 120, a first pump 122, a second pump 124 and a total organic carbon (TOC) analyzer 126. In this invention, a tank is named according to its location. For example, the processed drained water flows out from a processing station to storage tanks inside the factory before collecting in the water tank for servicing general factory equipment. The temporary storage tanks inside the plant are referred to as buffer tanks while the ones close to the equipment end are referred to as raw water tanks.

The three-way valve 102 is connected to the drained water outlet of the processing station 100. The direction of flow of drained water through the three-way valve 102 is determined by a control signal sent from the conductivity analyzer 104. The conductivity meter 104 is set up in the pipeline between the processing station 100 and the three-way valve 102 for finding the conductivity level of the drained water and transmitting the measured results to the controller 106. The controller 106 is electrically connected to the three-way valve 102 and the conductivity analyzer 104. According to the signal from the conductivity analyzer 104, the three-way valve 102 is triggered.

The recovery tank 108 is connected to the drained water outlet 128 of the three-way valve 102 for collecting preliminarily sorted recovered water. The buffer tank 110 is connected to the recovery tank 108 so that a total organic carbon (TOC) analysis of the water in the recovery tank 108 can be carried out inside the buffer tank 110. The interim tank 112 is connected to the buffer tank 110. The valve 130 is set up in the pipeline between the interim tank 112 and the buffer tank 110. The conductivity analyzer 132 is connected to the buffer tank 110 and electrically connected to the valve 130 for controlling the opening or closing of the valve 130. A liquid level measuring device 134 is set up inside the interim tank 112 to measure the liquid level. The raw water tank 114 and the raw water tank 116 are connected to the interim tank 112 for collecting different grades of recovery water. The valve 118 is set up in the pipeline between the interim tank 112 and the raw water tank 114. Similarly, the valve 120 is set up in the pipeline between the interim tank 112 and the raw water tank 116. Furthermore, the pumps 122 and 124 are set up between the interim tank 112 and the valves 118 and 120 for pumping recovered water from the interim tank 112 to the raw water tank 114 or 116. The total organic carbon analyzer 126 is connected to the buffer tank 110 for analyzing the total organic carbon value of the recovered water. The total organic carbon analyzer 126 is also electrically connected to the valves 118 and 120 for controlling the opening or closing of the valves 118 and 120.

In this embodiment, a single recovery tank is set up in the drained water recovery system. Obviously, additional recovery tanks such as another recovery tank 136 in FIG. 1 can be connected to the other drained water outlet 138 of the three-way valve 102 in preparation for carrying out subsequent recovered water sorting operations.

The drained water recovery system of a process device according to this invention utilizes the conductivity meter installed on each processing station to perform a preliminary drained water sorting operation and then uses a controller to channel drained water at different conductivity levels to different pipelines. Hence, any problem the drained water of a particular processing station will not affect the entire water recovery system. Furthermore, through the deployment of a conductivity meter and a total organic carbon analyzer together with the interim tank liquid level controller to sort out the recovered water, the quality of drained water in the source water tanks is such as to maintain a high recycling efficiency.

This invention also provides a method of recovering drained water. As shown in FIG. 1, the processing station 100 discards drained water out. The conductive analyzer 104 analyzes the conductivity level of the drained water flowing out form the processing station 100. According to the measured conductivity level, the three-way valve 102 is turned to redirect the drained water into the recovery tank 108 or some other recovery tank, for example, the recovery tank 136. Thereafter, the drained water in the recovery tank 108 is channeled into the buffer tank 110 and then the drained water in the buffer tank 110 is channeled to the interim tank 112. The drained water inside the buffer tank 110 is analyzed using the total organic carbon analyzer 126 to determine whether the drained water in the interim tank 112 is channeled to the first raw water tank 114 or the second raw water tank 116. The types of control executed by the interim tank 112 are described in more detail in the following.

Figure 2:
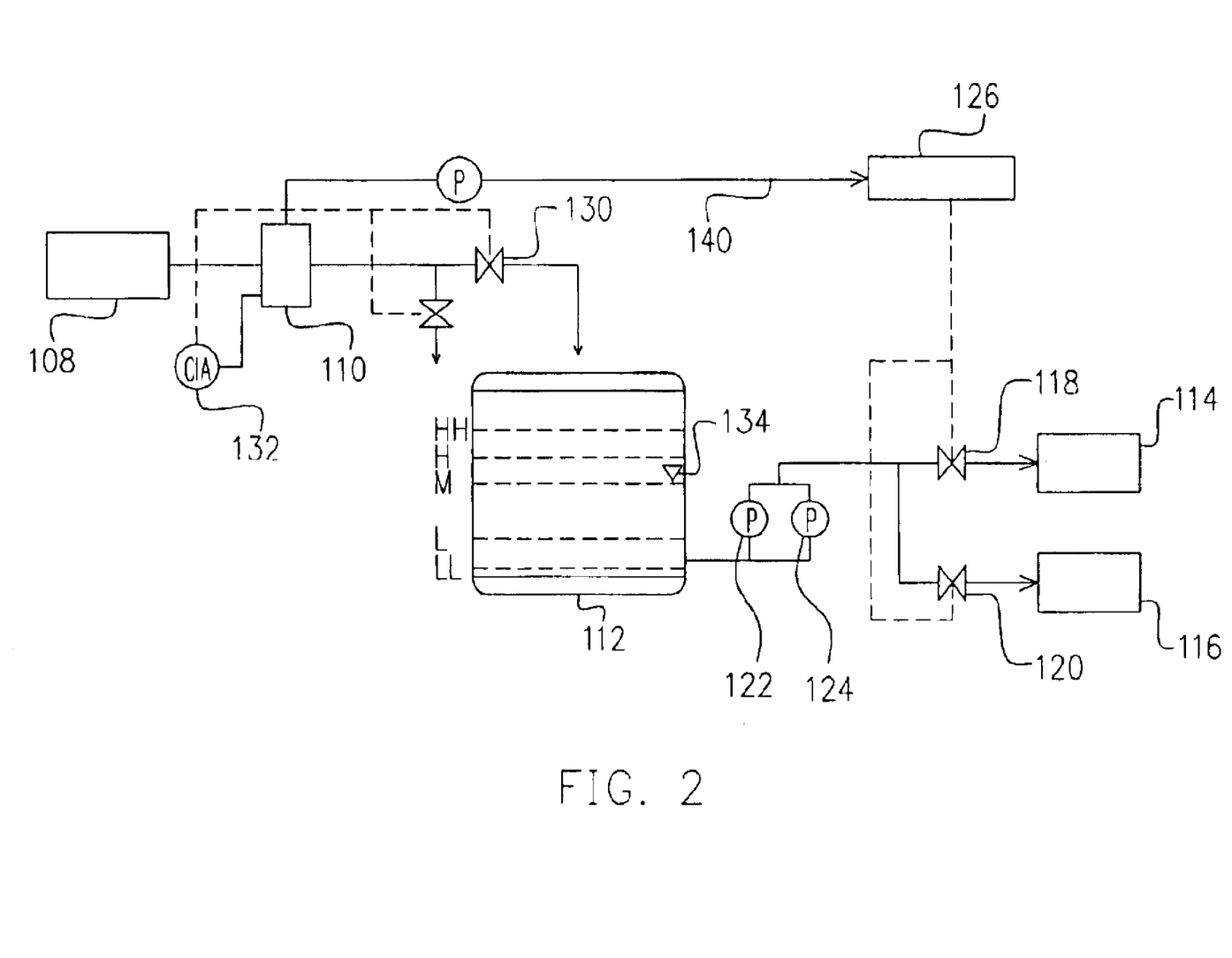
FIG. 2 is a schematic diagram showing the control system associated with an interim tank according to one preferred embodiment of this invention.

FIG. 2 is a schematic diagram showing the control system associated with an interim tank according to one preferred embodiment of this invention. As shown in FIG. 2, components identical to the ones in Fig. are labeled identically. The interim tank 112 has an internal liquid level measuring device 134 for measuring the liquid level inside the interim tank 112. In the embodiment of this invention, the interim tank 112 is internally divided into five liquid levels internally, namely, liquid level LL, liquid level L, liquid level M, liquid level H and liquid level HH. These liquid levels are set up, for example, at a height of 0.40 m, 0.55 m. 1.2 m, 1.7 m and 2.15 m from the bottom of the tank 112.

If the total organic carbon testing pipeline 140 has a diameter of about 0.9 cm, the pipeline 140 will have a cross sectional area of about 0.65 $cm^2$. If the total organic carbon testing pipeline 140 has a total length of about 10 m and the flow rate of the recovered water from the buffer tank 110 to the TOC analyzer 126 is 200 mL/minute, a total of 3.5 minutes is required to transport the recovered water from the buffer tank 110 to the TOC analyzer 126. If the time required to perform a TOC analysis by the TOC analyzer 126 is between 3 to 5 minutes, a total of between 6 to 8 minutes is required to sample and analyze the recovered water. While the TOC analyzer 126 is analyzing the water sample, the recovered water will flow from the buffer tank 110 to the interim tank 112. When the TOC analyzer 126 detects that the TOC value is greater than 1000 ppb, the recovered water with a TOC value greater than 1000 ppb may have already entered into the raw water tank 114 for holding drained water having a TOC value of 1000 ppb or less. In other words, if the drained water having a TOC value greater than 1000 ppb is not channeled to the raw water tank 116 for holding drained water having a TOC value greater than 1000 ppb, water in the raw water tank 114 will be contaminated.

The recovered water inside the raw water tank 114 is prevented from any contamination through the definition of operating liquid level within the interim tank 112 and a TOC control formula so that the recovery water system is properly managed. If the bottom surface of the interim tank 112 has an area of 5.0 $m^2$, the distance between the M liquid level and the LL liquid level is 0.8 m and the pumping rate of the pump 122 alone is 52 $m^3$/hour, the liquid level dropping rate is (52 $m^3$/hour)/(5.0 $m^2$)=10.4 m/hour. In other words, the worse case calculation shows that the time required for the recovery water to drop from the liquid level M to the liquid level LL is (0.8 m)/(10.4 m/hour)=0.077 hour or 4.6 minutes. When the amount of inflow and outflow is balanced so that the liquid level is maintained at a position higher than the liquid level M, a volume of water between the liquid level M and the liquid level LL flows out every 4.6 minutes. Because the TOC test signals is transmitted every 6 to 8 minutes, the TOC failed recovered water will be re-directed to the water-source tank 114 for two minutes if the pumps 122, 124 are not pre-started, the valve 120 is not pre-opened and the valve 118 is not pre-shut. Hence, the water in the raw water tank 114 will be contaminated. When the total organic carbon (TOC) value of the recovered water exceeds the preset value, the liquid level within the interim tank 112 must be checked. If the liquid level inside the interim tank 112 reaches the liquid level M, the pumps 122, 124 are switched on, the valve 120 is opened while the valve 118 is shut so that the recovered water failing the TOC test is channeled into the raw water tank 116. When the pumps 122 and 124 are turned on, the pumping rate is 83 m3/hour. Assume other conditions remain the same, a volume of water between the M liquid level and the LL liquid level is replaced once every 2.9 minutes. Therefore, the recovered water disqualified by the TOC test is channeled to the raw water tank 116.

Figure 3A:
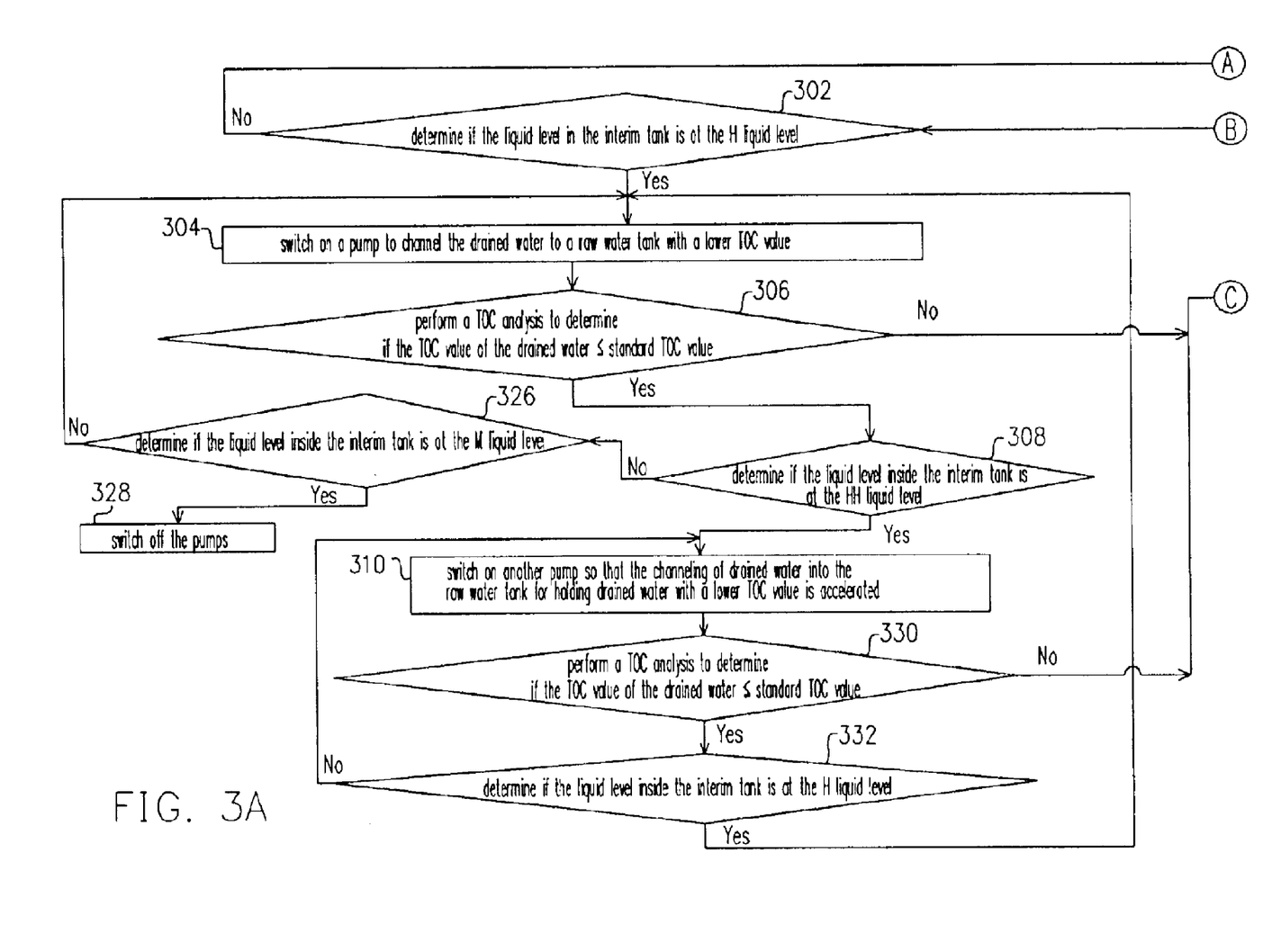
FIGS. 3A and 3B are flow charts showing the steps carried out to control the total organic carbon value in the recovered water according one preferred embodiment of this invention.
Figure 3B:
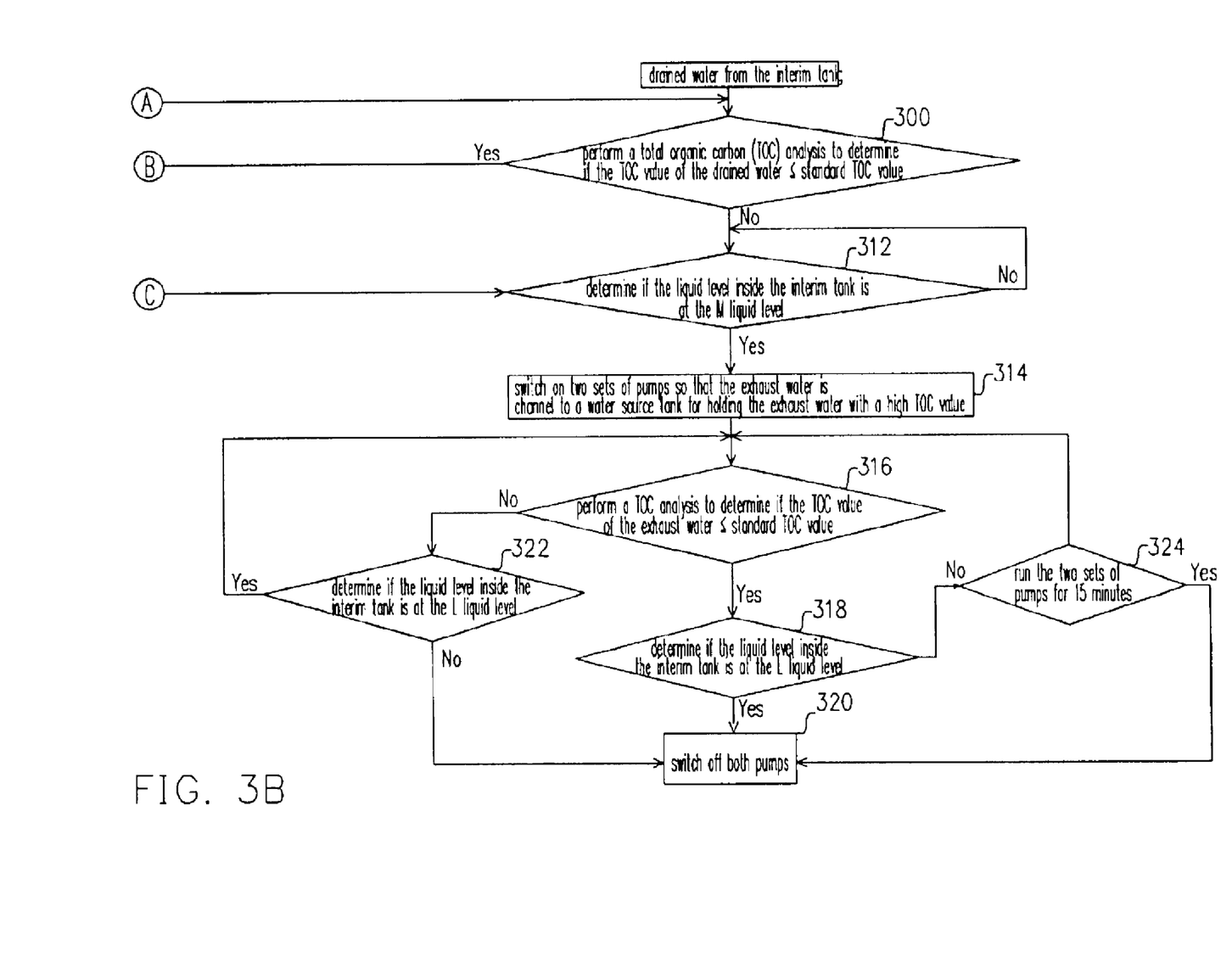

FIGS. 3A and 3B are flow charts showing the steps carried out to control the total organic carbon value in the recovered water according one preferred embodiment of this invention. The method of using the total organic carbon analysis and the liquid level to control outflow of drained water from the interim tank comprises the following steps.

In step 300, a first total organic carbon analysis is carried out on the drained water inside the buffer tank to determine whether the total organic carbon value is lower than a preset standard value. If the TOC value is below a preset standard value, carry out step 302 or else carry out step 312.

In step 302, check whether the liquid level inside the interim tank 112 is at the liquid level H. If the liquid level inside the interim tank 112 is at the liquid level H, carry out step 304 or else carry out step 300 to inspect the total organic carbon value inside the buffer tank again.

In step 304, switch on the pumps 122 and open the valve 118 but shut off the valve 120 so that the drained water is channeled into the raw water tank 114.

In step 306, carry out a second total organic carbon analysis on the drained water inside the buffer tank to determine whether the total organic carbon value of the drained water is lower than a preset standard value. If the TOC value of the drained water is lower than the preset standard value, carry out step 308 or else carry out step 312.

In step 308, check whether the liquid level inside the interim tank 112 is at the liquid level HH. If the liquid level inside the interim tank 112 is at the liquid level HH, carry out step 310 or else carry out step 326.

In step 310, switch on the other pump 124 so that drained water is channeled into the raw water tank 114 at an increasing speed.

In step 312, check whether the liquid level inside the interim tank 112 is at the liquid level M. If the liquid level inside the interim tank 112 is at the liquid level M, carry out step 314 or else continue to check whether the liquid level inside the interim tank 112 is at the liquid level M.

In step 314, switch on the pumps 122, 124, open the valve 120 but close the valve 118 so that drained water is channeled into the raw water tank 116.

In step 316, carry out a second total organic carbon analysis on the drained water inside the buffer tank to determine whether the total organic carbon value of the drained water is lower than a preset standard value. If the TOC value of the drained water is lower than the preset standard value, carry out step 318 or else carry out step 322.

In step 318, check whether the liquid level inside the interim tank 112 is at the liquid level L. If the liquid level inside the interim tank 112 is at the liquid level L, carry out step 320 or else carry out step 324.

In step 320, shut down the pumps 122 and 124.

In step 322, check whether the liquid level inside the interim tank 112 is at the liquid level L. If the liquid level inside the interim tank 112 is at the liquid level L, carry out step 320 or else carry out step 316 to inspect the TOC value of the drained water inside the buffer tank.

In step 324, permit the two pumps 122 and 124 to operate for a continuous duration such as 15 minutes.

In step 326, check whether the liquid level inside the interim tank 112 is at the liquid level M. If the liquid level inside the interim tank 112 is at the liquid level M, carry out step 328 or else carry out step 304.

In step 328, shut down the two pumps 122 and 124.

In step 330, carry out a third total organic carbon analysis on the drained water inside the buffer tank to determine whether the total organic carbon value of the drained water is lower than a preset standard value. If the TOC value of the drained water is lower than the preset standard value, carry out step 332 or else carry out step 312.

In step 332, check whether the liquid level inside the interim tank 112 is at the liquid level H. If the liquid level inside the interim tank 112 is at the liquid level H, carry out step 304 or else carry out step 310.

The drained water recovery system of a process device and recovering method of this invention can be applied to collect drained water from various types of semiconductor processing stations including, for example, a RCA wafer cleaning station. In the following, a RCA wafer cleaning station is used to illustrate the drained water collection according to this invention. According to the chemicals and the type of cleaning process, the conductivity meter can be used to measure the conductivity level of the drained water and sort out its quality. In general, the type of recovery is classified into pure water/drained water recovery, drained water/acidic drained water recovery, drained water/acidic fluoride drained water recovery and acidic drained water/acidic fluoride drained water.

Figure 4A:
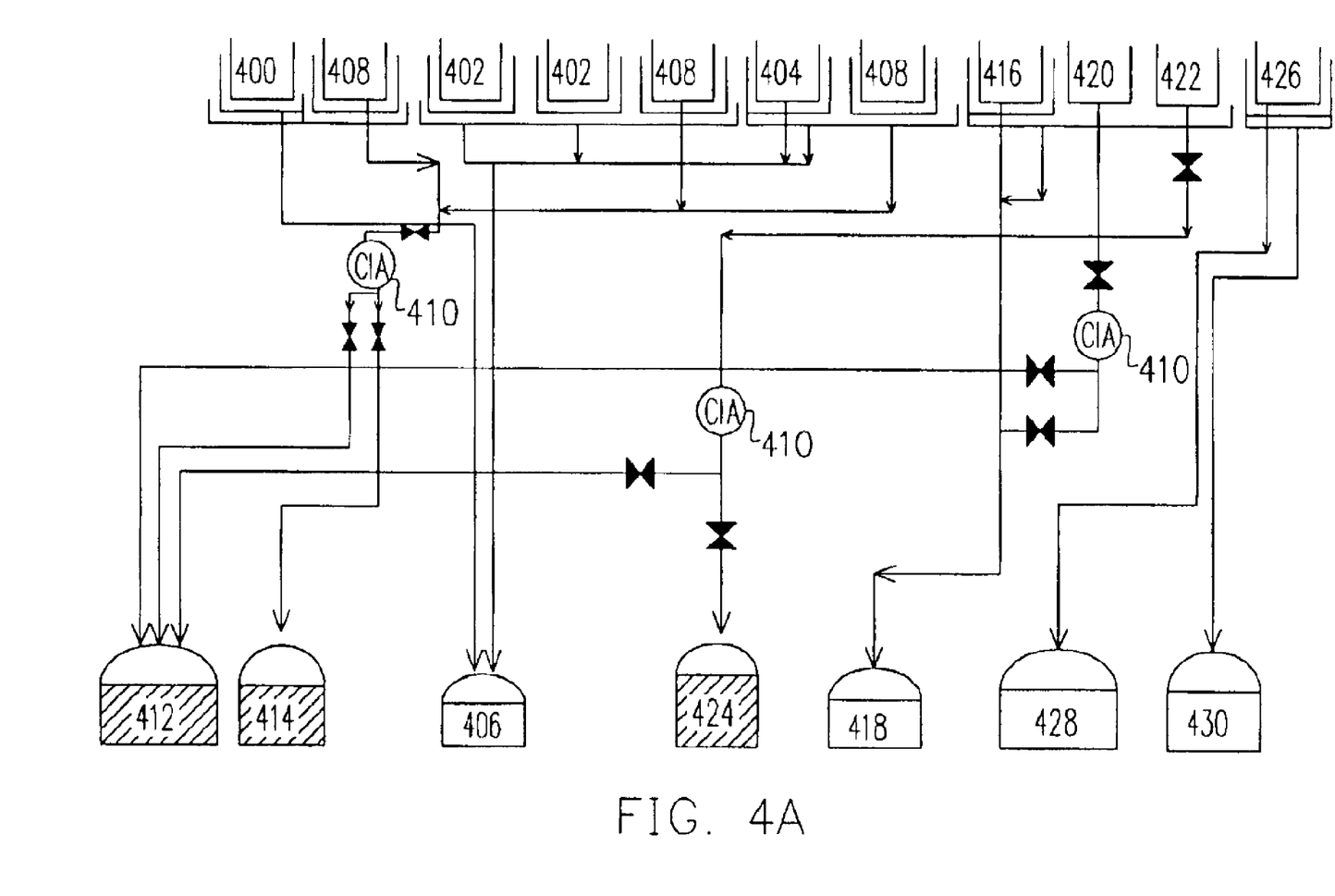
FIGS. 4A and 4B are schematic diagrams showing two drained water sorting systems for a RCA wafer cleaning station.

FIG. 4A is a schematic diagram showing an drained water sorting system for a RCA wafer cleaning station. In general, used SPM cleaning solution 400, used SC1 cleaning solution 402 and used SC2 cleaning solution 404 are drained to an acid drained water collection tank 406. After the rapid cleaning process using the SPM cleaning solution 400, the SC1 cleaning solution 402 and the SC2 cleaning solution, a large quality of de-ionized water 408 is used to wash the wafers. The conductivity of the drain de-ionized water 408 is measured using the conductivity meter 410 to determine its conductivity level. If the conductivity value lies within the range 10 to 1000 $\mu S/cm$, the de-ionized drained water 408 is channeled to an drained water collection tank 412. If the conductivity level lies within the range 1000 to 2000 $\mu S/cm$, the de-ionized drained water 408 is channeled to an acidic drained water collection tank 414. Due to the requirements of subsequent waste water treatment units, the used diluted hydrofluoric acid solution must be transferred to an acid fluoride drained water collection tank 418 and subsequently transferred to a waste water treatment plant for further processing. After cleaning the water with diluted hydrofluoric acid solution, the wafer is rinsed using de-ionized water 420. The used de-ionized water 420 is channeled to different collection tanks according to the drain/acidic fluoride drain classification. If the conductivity of the used de-ionized water 420 is within the range 10 to 1000 $\mu S/cm$, the used de-ionized water 420 is channeled to the drained water collection tank 412. However, if the conductivity of the used de-ionized water 420 is within the range 1000 to 2000 $\mu S/cm$, the used de-ionized water 420 is channeled to the acid fluoride drained water collection tank 418. The water collected in the final rinse (FR) tank 422 is recovered according to the pure water/drained water recovery scheme. If the conductivity of the used final rinse water is within the range 0 to 10 $\mu S/cm$, the used final rinse water is channeled to a pure water collection tank 424. If the used final rinse water is within the range 10 to 1000 $\mu S/cm$, the used final rinse water is channeled to the drained water collection tank 412. In addition, the used isopropyl alcohol for drying wafers is condensed and collected inside an isopropyl alcohol (IPA) collection tank 426. Thereafter, useful isopropyl alcohol is transferred to an IPA recovery system 428 while isopropyl alcohol waste is discarded to the IPA collection tank 430.

Figure 4B:
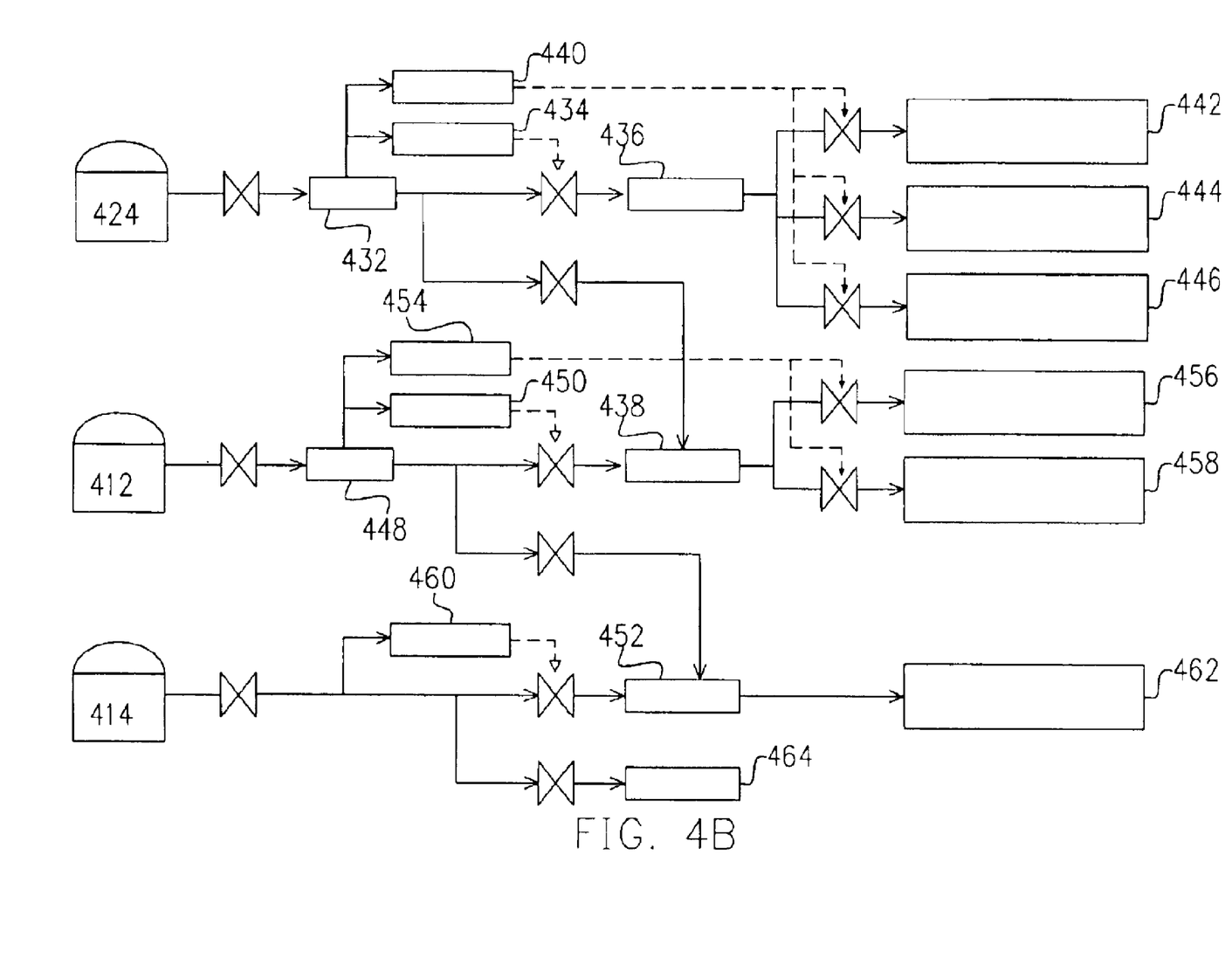

FIG. 4B is a flow diagram showing the total organic carbon analysis for sorting the drained water after the preliminary drained water sorting steps in FIG. 4A. The drained water inside the pure water collection tank 424, the drained water collection tank 412 and the acidic drained water collection tank 414 is further analyzed using conductive meters and total organic carbon analyzer. The analyzed water is distributed to the pure water, drained water or acidic drained water recovery system to supplement pure water and cooling water. The conductivity for pure water recycling is between 0 to 10 $\mu S/cm$, the conductivity for drained water recycling is between 10 to 1000 $\mu S/cm$ and the conductivity of acidic drained water recycling is between 1000 to 2000 $\mu S/cm$.

The recovered water inside the pure water collection tank 424 is channeled to a buffer bank 432. Inside the buffer tank 432, a conductivity meter 434 is used to measure the conductivity level of the recovered water. If the measured conductivity level is smaller than 10 $\mu S/cm$, the recovered water is transferred to an interim tank 436. However, if the measured conductivity level is greater than 10 S/cm, the recovered water is transferred to another interim tank 438. Thereafter, a total organic carbon (TOC) analyzer 440 is used to determine the total organic carbon (TOC) value of the recovered water inside the buffer tank 432. If the TOC value is smaller than 500 ppb, the recovered water inside the interim tank 436 is transferred to a pure water collection filter tank 422. If the TOC value is between 500 to 1000 ppb, the recovered water inside the interim tank 436 is transferred to a raw water tank of a recovered drained water 444. Finally, if the TOC value is greater than 1000 ppb, the recovered water inside the interim tank 436 is transferred to a raw water tank of a recovered acid drain 446.

The recovered water inside the drained water collection tank 412 is channeled to a buffer tank 448. Inside the buffer tank 448, a conductivity meter 450 is used to measure the conductivity level of the recovered water. If the measured conductivity level is smaller than $\hat{A}\mu$S/cm, the recovered water is transferred to the interim tank 438. However, if the measured conductivity level is greater than 1000 $\hat{A}\mu$S/cm, the recovered water is transferred to another interim tank 452. Thereafter, a total organic carbon (TOC) analyzer 454 is used to determine the total organic carbon (TOC) value of the recovered water inside the buffer tank 448. If the TOC value is smaller than 1000 ppb, the recovered water inside the interim tank 438 is transferred to a raw water tank of a recovered drained water 456. If the TOC value is greater than or equal to 1000 ppb, the recovered water inside the interim tank 438 is transferred to a raw water tank of a recovered acid drain 458.

The conductivity level of the recovered water inside the acidic drained water collection tank 414 is measured using a conductivity meter 460. If the measured conductivity level is smaller than 2000 $\hat{A}\mu$S/cm, the recovered water is transferred to the interim tank 452. However, if the measured conductivity level is greater than 2000 $\hat{A}\mu$S/cm, the recovered water is transferred to a raw water tank of acid/base drain 464.

In summary, this invention utilizes the conductivity meter installed on each processing station to perform a preliminary drained water sorting operation and then uses a controller to channel drained water at different conductivity levels to different pipelines. Furthermore, a conductivity meter and a total organic carbon analyzer together with an interim tank liquid level controller are deployed to improve the quality of drained water in the source water tanks and maintain a high recycling efficiency. Moreover, the recovering method is not limited to recycling the drained water from a RCA wafer cleaning station. The method can be applied to recycle the drained water produced by other semiconductor processes as well.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A drained water recovery system, comprising:
   a processing station with at least a water outlet;
   a first three-way valve connected to the water outlet;
   a first conductivity analyzer set up on a first pipeline between the processing station and the first three-way valve;
   a first controller electrically connected to the first three-way valve and the first conductivity analyzer such that the first three-way valve is activated according to a control signal from the first conductivity analyzer;
   a first recovery tank connected to a first drained water outlet of the first three-way valve;
   a buffer tank connected to the first recovery tank;
   a first interim tank connected to the buffer tank;
   a first raw water tank and a second raw water tank which are both connected to the interim tank;
   a first valve set up along a second pipeline between the interim tank and the first raw water tank;
   a second valve set up along a third pipeline between the interim tank and the second raw water tank;
   a first pump and a second pump set up along the second pipeline and the third pipeline; and
   a total organic carbon analyzer connected to the buffer tank and electrically connected to the first valve and the second valve for controlling the opening and closing of the first and the second valve.

2. The drained water recovery system of claim 1, wherein the system further comprises a second recovery tank connected to a second drained water outlet of the first three-way valve.

3. The drained water recovery system of claim 1, wherein the system further comprises a third valve set up along a fifth pipeline between the buffer tank and the interim tank.

4. The drained water recovery system of claim 3, wherein the system further comprises a second conductivity analyzer connected to the buffer tank and electrically connected to the third valve for controlling the opening and closing of the third valve.

5. The drained water recovery system of claim 1, wherein the system further comprises a liquid level measuring device set up inside the interim tank for measuring the liquid level inside the interim tank.

6. A method for recovering drained water of a processing station, comprising the steps of:
   draining water from the processing station;
   measuring the conductivity of the drained water using a conductivity analyzer;
   channeling the drained water to a recovery tank by controlling a three-way valve according to the measured conductivity;
   channeling the drained water from the recovery tank into a buffer tank;
   channeling the drained water from the buffer tank into an interim tank; and
   analyzing the drained water inside the buffer tank using a total organic carbon analyzer and re-directing the drained water inside the interim tank into a first raw water tank or a second raw water tank.

7. The method of claim 6, wherein the step of analyzing the drained water inside the buffer tank using the total organic carbon analyzer and re-directing the drained water inside the interim tank into the first raw water tank or the second raw water tank further comprising the steps of:
   (a) performing a first total organic carbon value analysis on the drained water inside the buffer tank to determine whether the total organic carbon value of the drained water is lower than a standard value;
   (b) determining whether the liquid level inside the interim tank is at a first high liquid level when the total organic carbon value of the first total organic carbon value analysis is lower than the standard value;
   (c) switching on a first pump, opening a first valve and switching off a second valve to channel the drained water into the first raw water tank when the liquid level inside the interim tank is at the first high liquid level;

(d) performing a second total organic carbon value analysis on the drained water inside the buffer tank to determine whether the total organic carbon value of the second total organic carbon value analysis is lower than the standard value;

(e) determining whether the liquid level inside the interim tank is at a second high liquid level when the total organic carbon value of the second total organic carbon value analysis is lower than the standard value, wherein the second high liquid level is higher than the first high liquid level;

(f) switching on a second pump to speed up the channeling of drained water to the first raw water tank when the liquid level inside the interim tank is at the second high liquid level;

(g) determining whether the liquid level inside the interim tank is at a middle level when the total organic carbon value of the first total organic carbon value analysis is higher than the standard value in step (a);

(h) switching on the first and the second pump, opening the second valve and switching off the first valve to channel the drained water into the second raw water tank when the liquid level inside the interim tank is at the middle level;

(i) performing a third total organic carbon analysis of the drained water inside the buffer tank to determine whether the total organic carbon value of the third total organic carbon analysis is lower than the standard value;

(j) determining whether the liquid level inside the interim tank is at a low liquid level when the total organic carbon value of the third total organic carbon analysis is lower than the standard vale; and (k) switching off the first and the second pump when the liquid level inside the interim tank is lower than the low liquid level.

8. The method of claim 7, wherein in step (d), the following steps are carried out when the total organic carbon value of the second total organic carbon analysis is higher than the standard value:

(l) determining whether the liquid level inside the interim tank is at the middle level;

(m) switching on the first and the second pump, opening the second valve and closing the first valve to channel the drained water into the second raw water tank when the liquid level inside the interim tank is at the middle level;

(n) performing a fourth total organic carbon analysis on the drained water inside the buffer tank to determine whether the total organic carbon value of the fourth total organic carbon analysis is lower than the standard value;

(o) determining whether the liquid level inside the interim tank is at the low liquid level when the total organic carbon value of the fourth total organic carbon analysis is lower than the standard value; and (p) switching off the first pump and the second pump when the liquid level inside the interim tank is at the low liquid level.

9. The method of claim 8, wherein in step (n), the following steps are carried out when the total organic carbon value of the fourth total organic carbon analysis is higher than the standard value:

determining whether the liquid level inside the interim tank is at the low liquid level; and switching off the first pump and the second pump when the liquid level inside the interim tank is at the low liquid level.

10. The method of claim 8, wherein in step (o), the following steps are carried out when the liquid level inside the interim tank is higher than the low liquid level:

running the first pump and the second pump for a period of time; and switching off the first pump and the second pump.

11. The method of claim 7, wherein in step (f), the following steps are carried out when the liquid level inside the interim tank is lower than the second high liquid level:

determining whether the liquid level inside the interim tank is at the middle liquid level; and switching off the first pump when the liquid level inside the interim tank is at the middle liquid level.

12. The method of claim 7, wherein in step (i), the following steps are carried out when the total organic carbon value of the third total organic carbon analysis is higher than the standard value:

determining whether the liquid level inside the interim tank is at the low liquid level; and switching off the first pump and the second pump when the liquid level inside the interim tank is lower than the low liquid level.

13. The method of claim 7, wherein in step (j), the following steps are carried out when the liquid level inside the interim tank is higher than the low liquid level:

running the first pump and the second pump for a period of time; and switching off the first pump and the second pump.

14. The recovery method of claim 7, wherein after step (f), further comprising the steps of:

performing a fifth total organic carbon analysis on the drained water inside the buffer tank and determining whether the total organic carbon value is lower than the standard value, determining whether the liquid level inside the interim tank is at the first high liquid level when the total organic carbon value of the fifth total organic carbon analysis is lower than the preset standard value; and determining whether the liquid level inside the interim tank is at the middle liquid level when the total organic carbon value of the fifth total organic carbon analysis is not lower than the preset standard value; and determining whether the liquid level inside the interim tank is at the first high liquid level;

carrying out the operation in step (c) when the liquid level inside the interim tank is at the first high liquid level; and carrying out the operation in step (f) when the liquid level inside the interim tank is not at the first high liquid level.

15. A method of recovering drained water from a processing station, comprising the steps of:

(a) draining water from the processing station;

(b) channeling the drained water to one of a plurality of recovery tanks according to the conductivity of the drained water;

(c) channeling the drained water inside one of the plurality of recovery tanks into a buffer tank;

(d) channeling the drained water inside the buffer tank into an interim tank;

(e) performing a first total organic carbon analysis on the drained water inside the buffer tank to determine whether the total organic carbon value of the first total organic carbon analysis is lower than a standard value;

(f) determining whether the liquid level inside the interim tank is at a middle liquid level when the total organic carbon value of the first total organic carbon analysis is higher than the standard value;

(g) switching on a first pump and a second pump, opening a first valve and closing a first valve to channel the drained water into a second raw water tank when the liquid level inside the interim tank is at the middle liquid level;

(h) performing a second total organic carbon analysis on the drained water inside the buffer tank to determine whether the total organic carbon value of the second total organic carbon analysis is lower than the standard value;

(i) determining whether the liquid level inside the interim tank is at a low liquid level when the total organic carbon value of the second total organic carbon analysis is lower than the standard value; and (j) switching off the first pump and the second pump when the liquid level inside the interim tank is at the low liquid level.

16. The method of claim 15, wherein in step (e), the following steps are carried out when the total organic carbon value of the first total organic carbon analysis is lower than the standard value:

(k) determining whether the liquid level inside the interim tank is at a first high liquid level;

(l) switching on a first pump, opening a first valve and closing a second valve so that the drained water is channeled into a first raw water tank;

(m) performing a third total organic carbon analysis on the drained water inside the buffer tank to determine whether the total organic carbon value of the third total organic carbon analysis is lower than the standard value;

(n) determining whether the liquid level inside the interim tank is at a second high liquid level when the total organic carbon value of the third total organic carbon analysis is lower than the standard value, wherein the second high liquid level is higher than the first high liquid level; and (o) switching on the second pump to speed up the channeling of drained water into the first raw water tank when the liquid level inside the interim tank is at the second high liquid level.

17. The method of claim 16, wherein in step (n), the following steps are carried out when the liquid level inside the interim tank is lower than the second high liquid level:

determining whether the liquid level inside the interim tank is at the middle liquid level; and switching off the first pump when the liquid level inside the interim tank is at the middle liquid level.

18. The method of claim 15, wherein in step (h), the following steps are carried out when the total organic carbon value of the second total organic carbon analysis is higher than the standard value:

determining whether the liquid level inside the interim tank is at the low liquid level; and switching off the first pump and the second pump when the liquid level inside the interim tank is lower than the low liquid level.

19. The method of claim 15, wherein in step (i), the following steps are carried out when the liquid level inside the interim tank is higher than the low liquid level:

running the first pump and the second pump for a period of time; and switching off the first pump and the second pump.

* * * * *